United States Patent
Nelson et al.

(10) Patent No.: US 7,477,254 B2
(45) Date of Patent: Jan. 13, 2009

(54) SMOOTH TRANSITIONS BETWEEN ANIMATIONS

(75) Inventors: Elizabeth K. Nelson, Seattle, WA (US); Kurt B. Jacob, Redmond, WA (US); Matt Calkins, Seattle, WA (US); Michael J. Hillberg, Beaux Arts, WA (US)

(73) Assignee: Microsoft Corporation, Redmond, WA (US)

( * ) Notice: Subject to any disclaimer, the term of this patent is extended or adjusted under 35 U.S.C. 154(b) by 151 days.

(21) Appl. No.: 11/181,197

(22) Filed: Jul. 13, 2005

(65) Prior Publication Data

US 2007/0013699 A1    Jan. 18, 2007

(51) Int. Cl.
*G06T 13/00* (2006.01)
*G09G 5/00* (2006.01)

(52) U.S. Cl. ...................................... 345/473; 345/661

(58) Field of Classification Search ......... 345/473–475, 345/661; 715/503, 716, 726, 746
See application file for complete search history.

(56) References Cited

U.S. PATENT DOCUMENTS

| | | | |
|---|---|---|---|
| 5,818,462 A * | 10/1998 | Marks et al. ................ 345/473 |
| 6,011,562 A * | 1/2000 | Gagne et al. ................ 345/473 |
| 6,057,833 A * | 5/2000 | Heidmann et al. .......... 715/726 |
| 2003/0132959 A1* | 7/2003 | Simister et al. ............. 345/473 |
| 2003/0146915 A1* | 8/2003 | Brook et al. ................ 345/473 |
| 2004/0130550 A1 | 7/2004 | Blanco et al. ............... 345/473 |
| 2005/0091637 A1 | 4/2005 | Schechter et al. ........... 717/110 |
| 2006/0221081 A1* | 10/2006 | Cohen et al. ................ 345/473 |

OTHER PUBLICATIONS

U.S. Appl. No. 10/992,462, filed Nov. 18, 2004, Nelson et al.

* cited by examiner

*Primary Examiner*—Ryan R Yang
(74) *Attorney, Agent, or Firm*—Merchant & Gould PC

(57) ABSTRACT

Smooth transitions between rich media (e.g., animations of visual elements of a UI) are provided when a "second" animation is started on a property of a visual element for which a "first" animation is already running. When the second animation is started, an animation system causes a current value of the property that resulted from the running of the "first" animation (i.e., snapshot) to be stored, terminates or releases the first animation, and then causes the second animation to run using the snapshot as the "from" value of the property. Because the second animation "begins" at exactly the point at which the first animation ended, the transition between the first and second animation is smooth. An animation storage object can be created for a property for which an animation has been triggered to store base values and snapshots of the property while being animated.

20 Claims, 10 Drawing Sheets

SMOOTH TRANSITIONS BETWEEN ANIMATIONS

BACKGROUND

In some interactive systems, visual elements can be implemented that respond by "animating" in response to user interaction. For example, a button being displayed in a user interface (UI) can be implemented so that it grows or shrinks or rotates, etc. when the user positions the cursor over the button. In some situations, it may be desirable to have multiple animations being performed on a single visual element. In some systems, the display of the visual element may appear to "glitch" when a currently running animation of the visual element transitions to another animation, which may be undesirable in some scenarios. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for enabling smooth transitions between rich media (e.g., animations of visual elements of a UI). In one aspect, when an animation is started on a property of a visual element for which another animation is already running, the "second" animation may be configured to store a current value of the property that resulted from running of the "first" animation (i.e., snapshot), release the first animation, and then run the second animation using the snapshot as the "from" value of the property. This handoff behavior is referred to "snapshot and replace" behavior. Because the second animation "begins" at exactly the point at which the first animation ended, the transition between the first and second animation is smooth.

In another aspect, an animation storage object is created for a property for which an animation has been triggered. The animation storage object is to store one or more base values of the property targeted by the animation and, in addition, any snapshots of that property if another animation is triggered while the initial animation is still running.

In yet another aspect, multiple layers of animations may be applied to a property, with transitions between layers having composition handoff behavior. In some implementations, a transition between animations within a layer can have composition or "snapshot and replace" behavior. In other implementations, a transition between animations between layers can have composition or "snapshot and replace" behavior.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following FIGS., wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary Operating Environment

Figure 1:
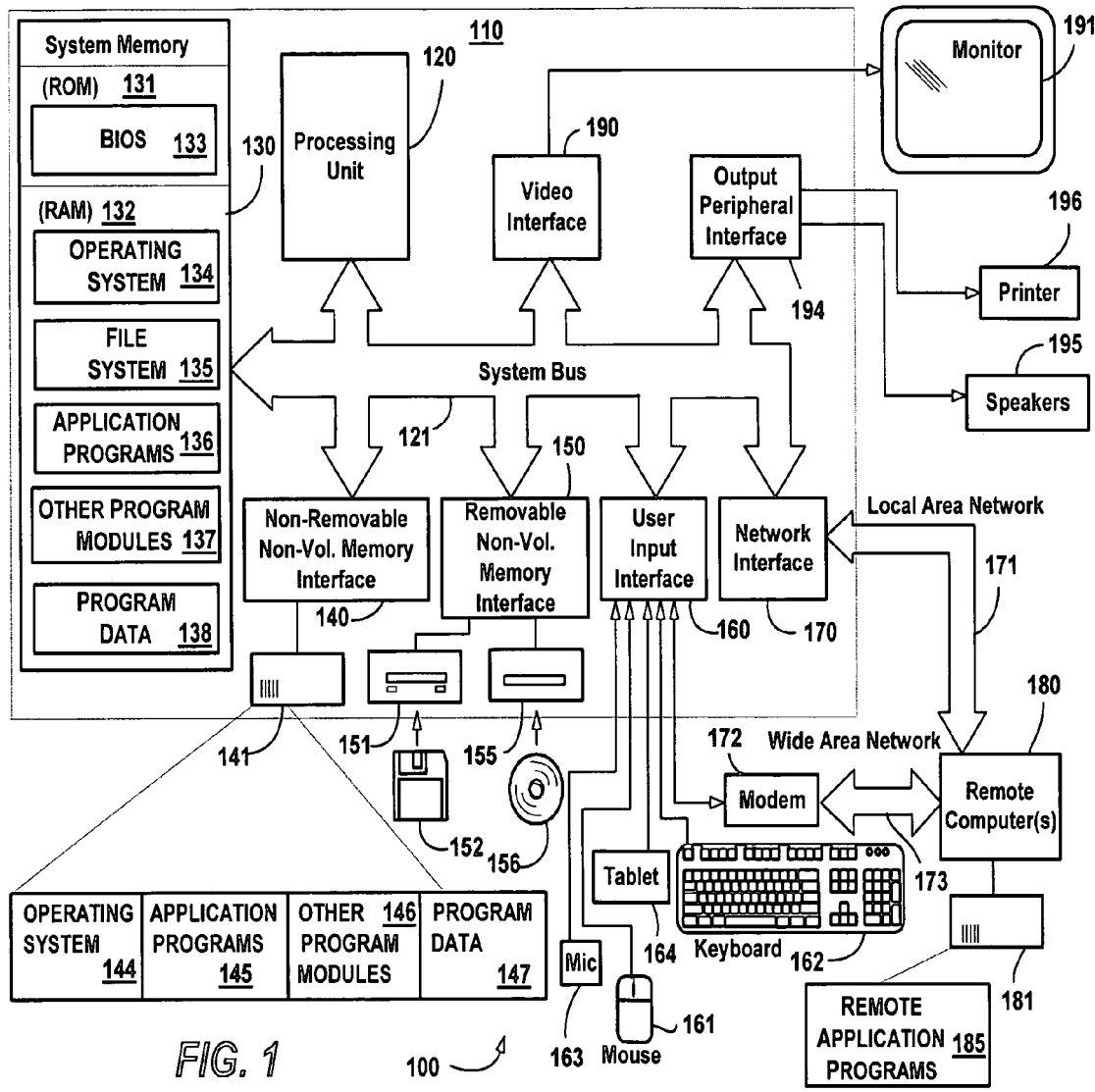
FIG. 1 is a block diagram representing an exemplary computer system into which the various embodiments may be incorporated.

FIG. 1 illustrates an example of a suitable computing system environment 100 on which smooth transitions between animations may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Example Architecture

Figure 2:
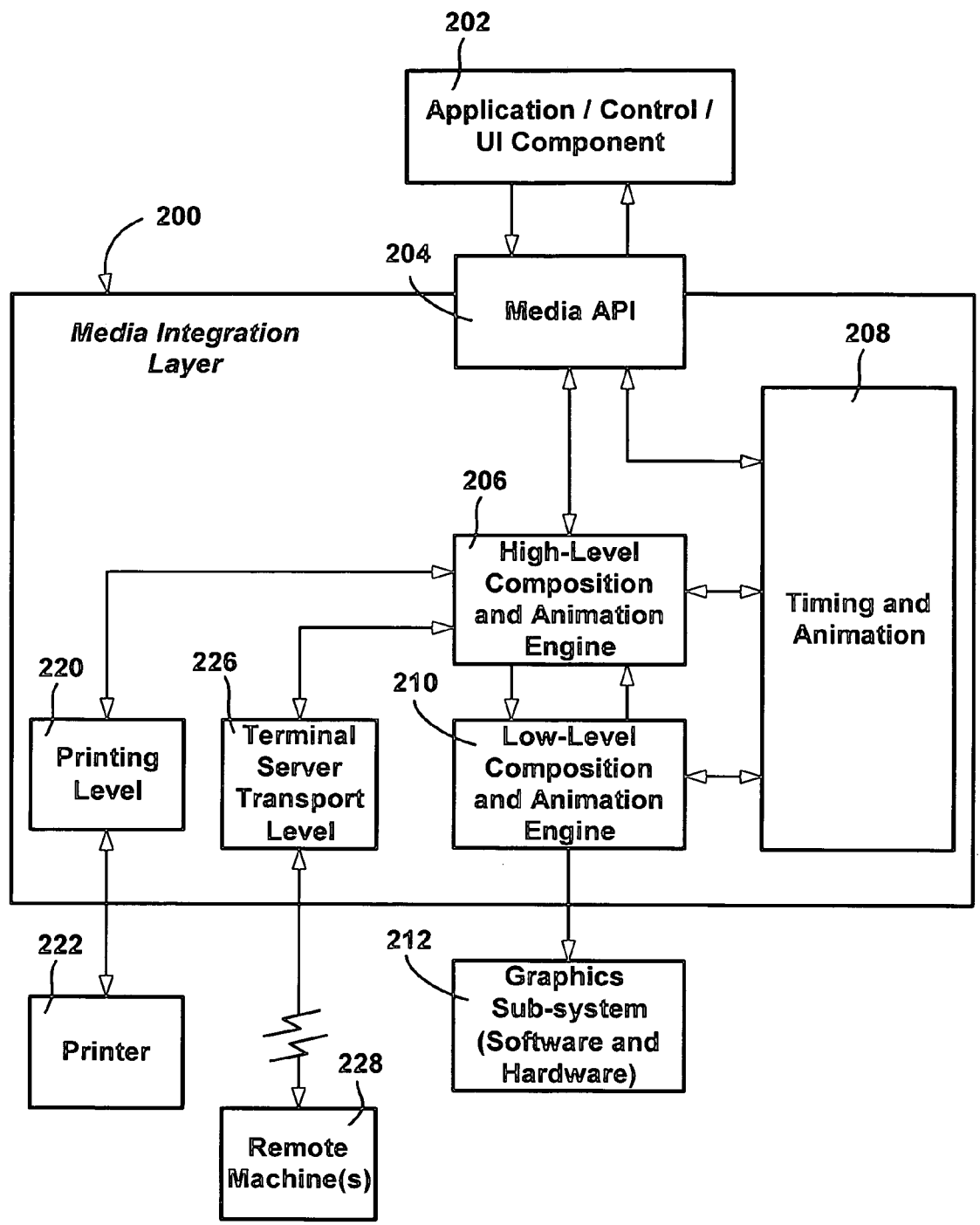
FIG. 2 is a block diagram representing a media integration layer architecture in accordance with an embodiment.

One aspect is generally directed towards providing smooth, complex animations and/or media on computer systems. To this end, as generally presented in FIG. 2, a media integration architecture 200 is provided. An application program, control or other similar higher-level program code (e.g., a user interface of an operating system component) 202 accesses the media integration layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower-level components described herein. As such, any reference to such higher-level program code, whether referred to as an application program, user interface, and so on, should be considered equivalent.

In one implementation, the media integration architecture 200 includes a high-level composition and animation engine 206, timing and animation components 208, and a low-level composition and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

In general, the high-level composition and animation engine (also referred to herein as the high-level compositor and animator or the high-level engine or component) 206 builds a display element tree to represent a graphics scene provided by the application program 202, while the timing and animation components provide declarative (or other) animation and timing control. The low-level compositing and animation engine (also referred to herein as the low-level compositor and animator or low-level engine or component) 210 composes the renderings for the scenes of multiple applications, and with rendering components, implements the actual rendering of graphics to the screen. Note, that it is still possible to do time-consuming or application-specific rendering at a higher levels, and pass references to a bitmap or the like to the lower layers.

The high-level composition and animation engine 206 builds the element tree structure and traverses the structure, creating rendering instructions and simple animation intervals to be passed to the low-level compositing and animation engine 210. The rendering instructions generated by the high-level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212. Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228. Note that richer information also may be passed across the network, e.g., it may be desirable to have the remote machine handle mouse rollover effects locally, without any network traffic.

In this implementation, the media integration architecture 200 thus separates graphics processing into multiple levels, and each of these levels performs some intelligent graphics processing which together allows applications' user interfaces and the like 202 to output graphics with smooth animation, composite the graphics with the graphics of other applications, and work with video frames. The animation and/or compositing may also be synchronized with audio output. For example, by synchronizing audio with the frame rate at the low-level component, the timing of audio can essentially be exact with that of video or graphics, and not dependent on the ability of task-scheduled, complex pre-processing to keep up with the refresh rate.

Figure 3:
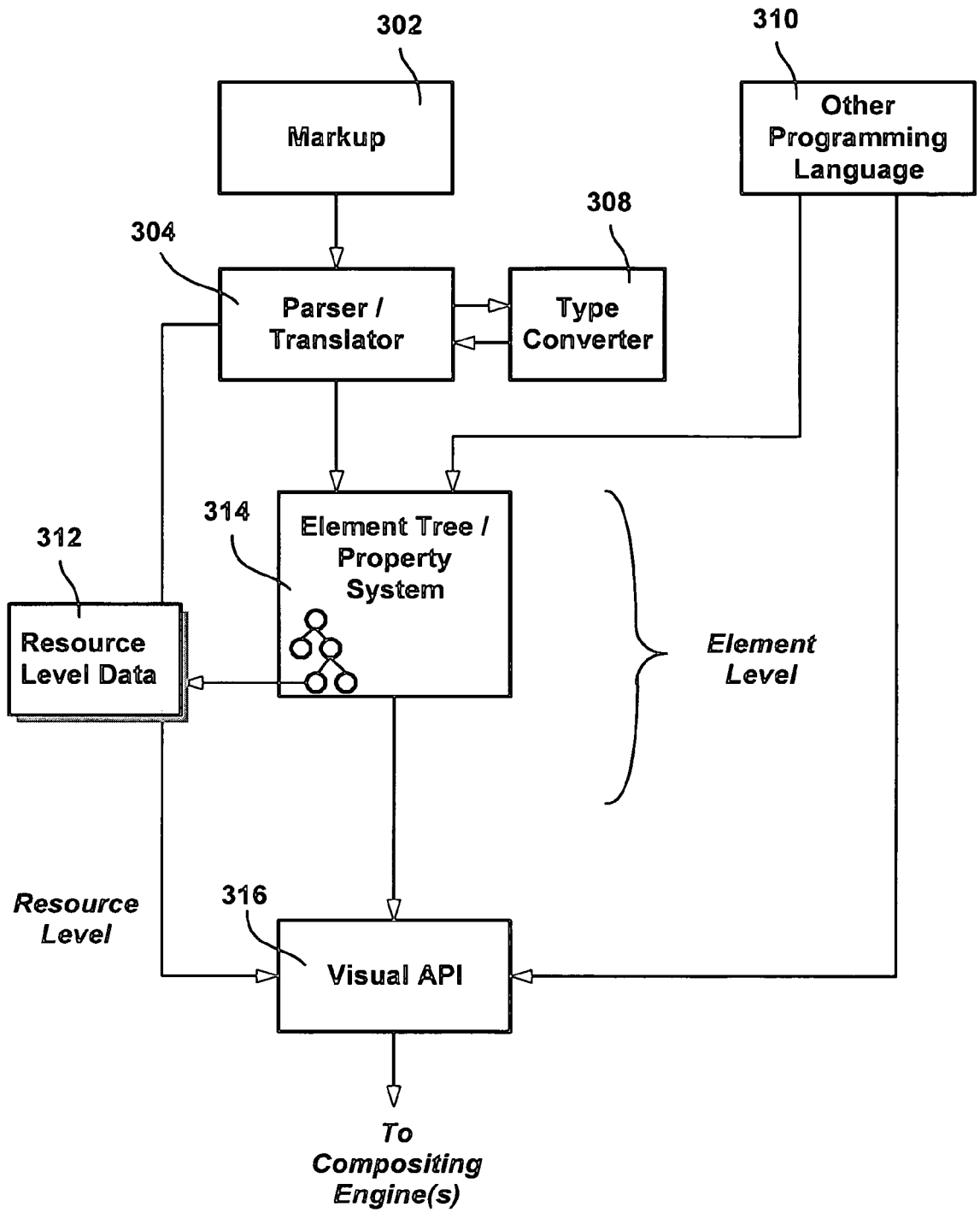
FIG. 3 is a representation of components for interpreting markup language code to interface with the visual API layer, in accordance with an embodiment.

FIG. 3 represents one implementation in which markup code 302 such as XAML-based code may be interpreted by a parser/translator 304. In general, the parser/translator 304 adds elements to the element tree/property system 314; the elements are visual objects that do their own layout. Further, note that some or all of the markup code may be compiled rather than interpreted on demand, thereby improving efficiency.

In general, an element is an object in the element layer that participates in the property system, triggering and layout/presentation system. The parser 304 finds tags and decides if those tags help to define an element or a resource object. In the special case of a VisualBrush, for example, the same tags may be interpreted as elements or also interpreted as resource objects, depending on the context of where those tags appear, e.g., depending on whether appearing in complex property syntax or not, as described in U.S. patent application Ser. No. 10/401,717.

In addition to being present inline in the markup, a resource instance may be located elsewhere (e.g., in the markup or in a file, which can be local or on a remote network and appropriately downloaded), and referenced by a name, (e.g., a text name, reference or other suitable identifier). In this manner, a scene designer can reuse an element in the element tree throughout a scene, including elements described by the complex property syntax. As will be described below, a resource may include a storyboard, allowing storyboards to be reused.

The parser 304 handles markup in the complex property syntax by accessing the type converter 308 as necessary, and also by matching specified parameters to the object properties, thereby handling the complexity for the scene designer. Thus, the parser 304 does not just set up the objects, but also sets properties on the objects. Because the same rendering model is shared between the element level and the API level, many of the objects are essentially the same. This makes parsing/translation highly efficient, and also allows different types of programming languages (e.g., C#-like languages) the ability to easily convert from the markup to its own syntax, and vice-versa. Note that as represented in FIG. 3, another such programming language 310 (which may comprise compiled markup) can add elements to the element tree 314, or can directly interface with the visual API layer 316.

As also represented in FIG. 3, the same markup 302 may be used to program at an element level and a resource level. In general, the element level gives the scene designer full programmability, usage of the property system that provides inheritance (e.g., style-sheet like features), and triggering (e.g., whereby an element may have attached code to change its appearance, position and so forth in response to a user input event or action). However, various embodiments also provide a resource-level mechanism by which scene designers can essentially shortcut the element tree and program directly to the visual API layer. For many types of static shapes, images and the like where element-level features are not needed, this provides a more efficient and lightweight way to output the appropriate object.

For purposes of controlling animation and media output, a timing tree comprising clocks is also maintained, as described below with reference to FIGS. 4 and 5. In general, the high-level compositor and animator engine 206 performs complex processing (sometimes referred to as compiling) that significantly simplifies the amount of processing and significantly reduces the amount of data that lower levels need to deal with to render the correct output. Note, however, that the amount and type of processing that is performed by the higher level may be dependent to a significant extent on the load, configuration and capabilities of the lower levels. For example, if high capability graphics hardware is present, the higher level may do a lesser amount of processing, and vice-versa. The high-level and low-level layers are adaptive to these factors.

In general, animation is accomplished by both the high-level compositor and animation engine 206 and the low-level compositor and animation engine 210. In one implementation, the high-level engine 206 traverses the scene and updates animation parameters with intervals for later interpolation, and packages these simplified data structures into instructions that get passed to the lower-level engine 210. This may be done in a synchronous and/or asynchronous manner. The interval data can be considered as including the timing endpoints (start and end timing data), as well as the parameterized values for the rendering instruction. Note that the high-level engine 204 can perform some or all of a requested interpolation, e.g., if an interpolation or other motion function is too complex for the lower-level engine 210 to handle, or the lower-level cannot keep up with the processing demands placed thereon, the higher-level engine can perform some or all of the calculations and provide the lower-level with simplified data, instructions, tessellations, and so on to accomplish the desired result.

In a typical case when the lower level does perform interpolations, for each frame of animation, the low-level engine 210 interpolates the parameter intervals to obtain instantaneous values, and decodes the instructions into rendering commands executed by the graphics device. The graphics device composes the final scene adding any video frames that might be present in the scene. Other data also may be added, such as content protected by digital rights management.

The high-level engine 206 thus traverses the scene data-structures, computes an interval describing each animated parameter for a period of time, and passes these intervals and simplified parameterized drawing instructions to the low-level engine 210. The parameter data includes start time, end time, interpolator and interpolation data. By way of example, instead of erasing and redrawing an image so that it appears to move, the high-level compositor and animation engine 206 can instruct the low-level compositor and animation engine 210 as to how the image should change over time, e.g., starting coordinates, ending coordinates, the amount of time (interval) that the image should move between the coordinates, and a motion function such as linear; (note that motion is not required for animation, as a stationary object may be animated by changing its color property, for example). The low-level compositor and animation engine 210 will interpolate to determine new positions between frames, convert these into drawing instructions that the graphics device can understand, and pass the commands to the graphics device. Each pass of the high-level engine 206 preferably provides sufficient data for the low-level engine 210 to perform smooth animation over several frames.

The low-level (e.g., fast-tick) engine 210 is a separate task from the high-level engine 206. The low-level engine 210 receives the simplified parameterized drawing instructions and parameter intervals describing the scene from the high-level engine 206. The low-level engine maintains and traverses these data structures until new ones are provided by the high-level engine 206. The low-level engine may service multiple high-level engines 206, maintaining separate data structures for each. The one-to-many relationship between the low-level engine 210 and high-level engine 206 allows the system to smoothly animate multiple scenes simultaneously.

The low-level engine 210 interpolates essentially instantaneous animation parameters based on the high-level engine's provided intervals, updates drawing instructions and renders the scene for every frame. The low-level engine 210 task runs at a high priority on the system, to ensure that frames are ready for presentation such as at the graphics hardware screen refresh rate. The interpolations performed by the low-level engine 210 are thus typically limited to simple, fast functions such as linear, piecewise linear, cubic spline and those of similar speed.

Figure 4:
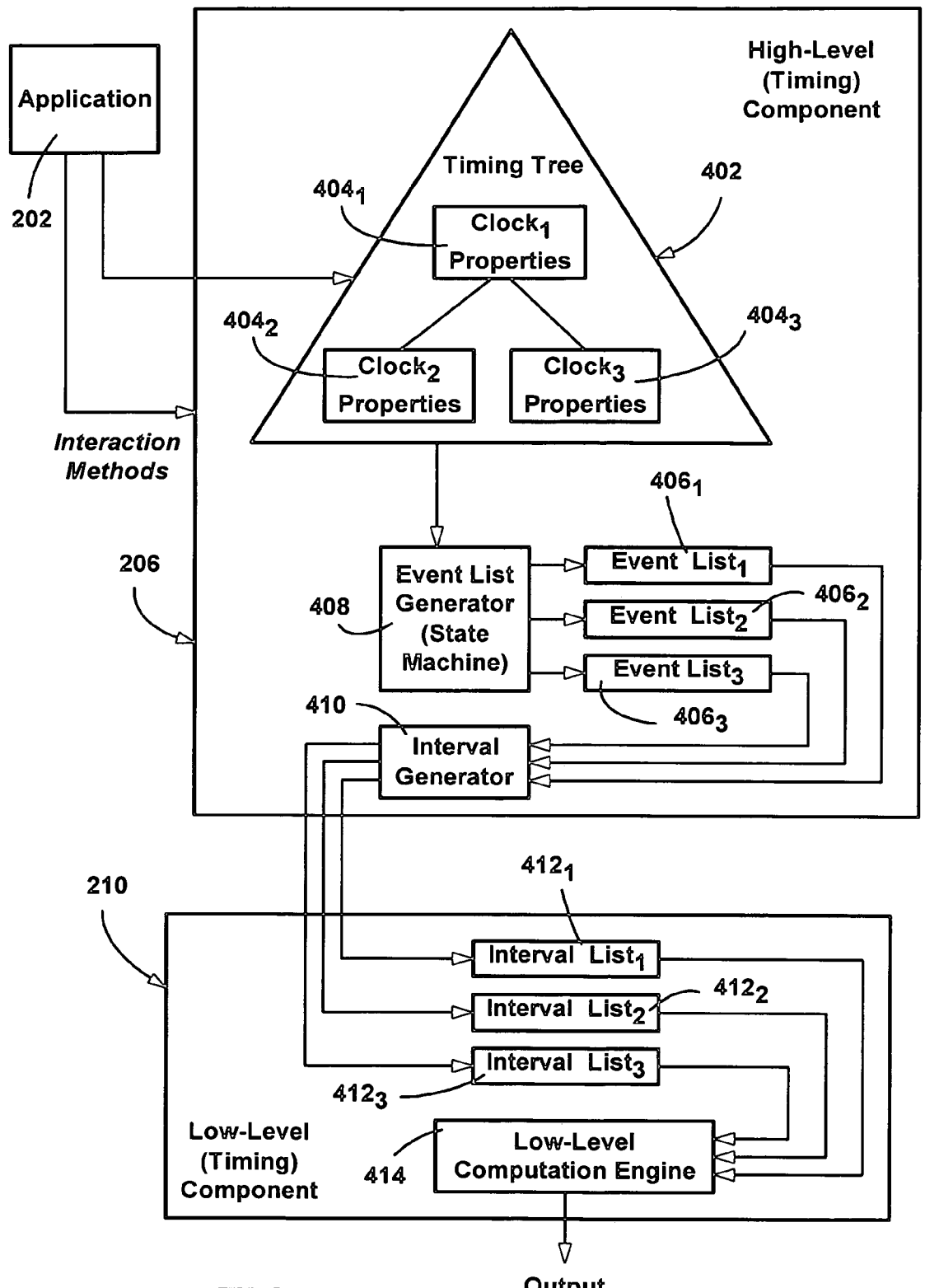
FIGS. 4 and 5 are block diagrams generally representative of a two-level architecture having timing components for converting clock property data to intervals for use in determining progress data in accordance with an embodiment.
Figure 5:
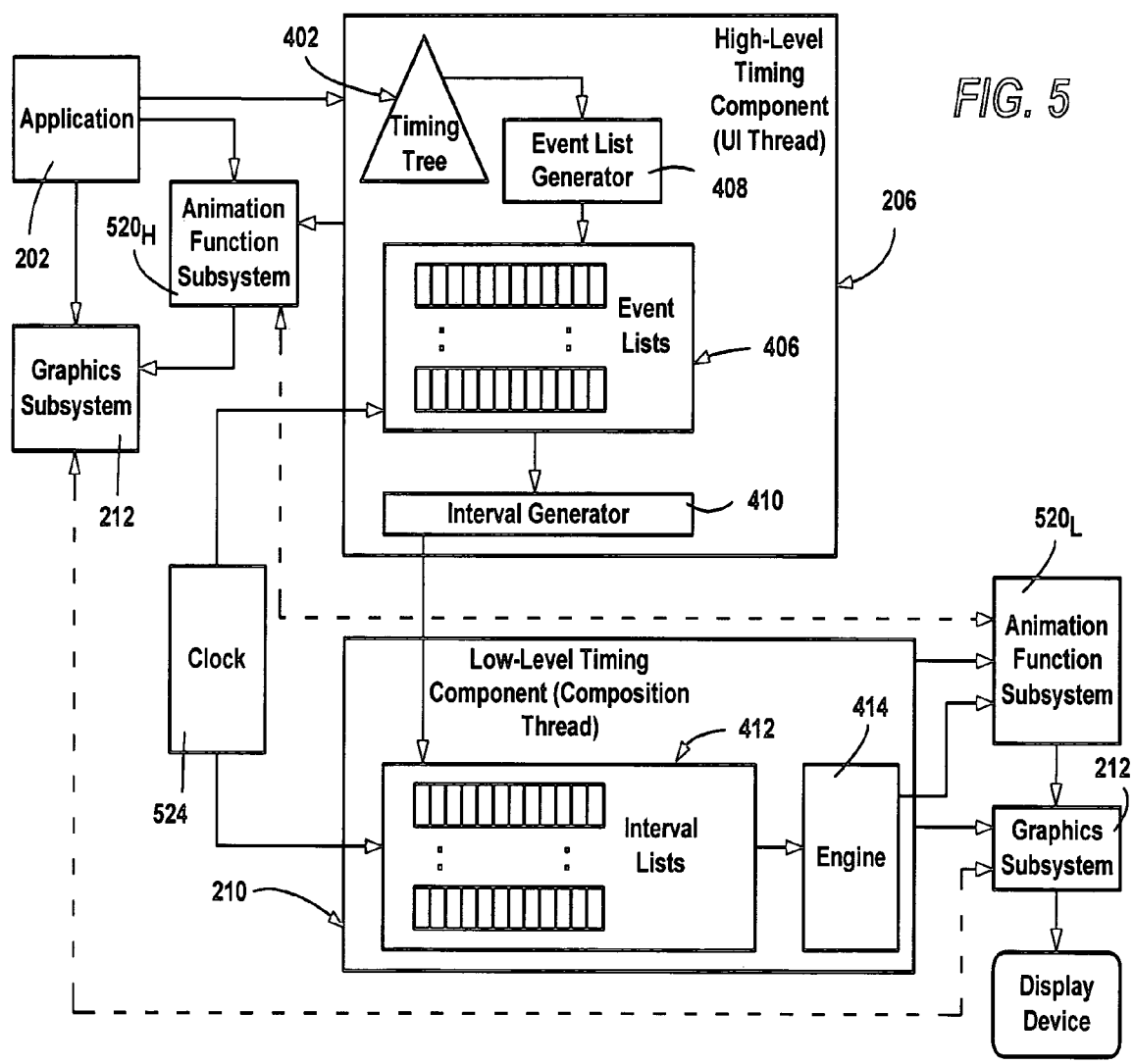

With respect to animation and media, as generally represented in FIGS. 4 and 5, a program such as the application program 202, specifies animation property values along with timing information, referred to as clocks or clock properties, to the high-level component 206. As described below, essentially any independent animation or media (e.g., linear media such as video and audio), as well as a storyboard that coordinates specified animations, will have a clock maintained for it at the high-level component. In general, the author specifies timeline data that is instantiated into the clocks as appropriate to keep them synchronized. In some embodiments, a storyboard is a timeline that is composed of a group or tree of timelines. A storyboard can provide targeting information such that its tree of timelines can target multiple properties on multiple elements. In addition, Animations are types of Timelines in some embodiments.

The clock properties comprise timing properties that define the initial synchronization relationship between a given clock and the rest of the timing structure. As shown in FIG. 5, the high-level component 206 may call high-level animation functions $520_H$ (e.g., written in managed code, which is code that provides information in the form of metadata that allows a common language runtime on which it runs to control its operation) in order to determine a current value of a property of an animation. During fast frame rate computations, the low-level component 210 calls similar (or the same) animation functions $520_L$ with the progress computed by the engine 414 in order to determine a current property value of an animation. Note that in alternative implementations, the animation functions may be built into the lower-level component, for example.

In general, animations and linear media are associated with a set of clocks which are related to each other by synchronization primitives and rules. The clocks may be hierarchically arranged, e.g., the application program has a parent clock, and animated objects of the application program are children, which in turn may have other children. When a property of a clock is defined or modified, any children of that clock are affected. For example, pausing a parent clock pauses any of its child clocks, and doubling the speed of a parent clock doubles the speed of any of its child clocks.

These clock properties may be modified by source events comprising interactive control events initiated by the application at run-time. Thus, the clocks are interactive, in that each clock can be individually started, paused, resumed and stopped at arbitrary times by the application, e.g., in response to user input. In addition, new clocks can be added to the timing structure, and existing clocks can be removed.

As described in aforementioned U.S. patent application Ser. No. 10/693,822, the high-level timing component may generate an interval list for each clock based on a stored list of events (begin, pause, and so forth) and the associated synchronization primitives. The activation intervals are straightforward, non-overlapping segments that describe the time expressed by a given clock at different points in real-world time.

As represented in FIG. 4, at least some of the clock properties may be hierarchically related in a timing tree 402 of clocks. Three such clocks with their properties are shown in FIG. 4, namely clock properties $404_1$-$404_3$, however it is understood that many more clocks and alternative timing trees may be present in a given situation. For each clock, which for example may correspond to an animated object (or set of Storyboard-coordinated objects) to be displayed, the high-level component 206 includes a state machine, referred to as an event list generator 408, which generates an event list (e.g., $406_1$) from the clock properties. In general, the event list generator 408 groups the events that were initially scheduled by the specified clock properties together with any explicit interactive events, such as pause and resume requests that are received with respect to the animation, into an event list. A clock is maintained for each animation (or group of animations via a storyboard, as described below), and thus there is an event list corresponding to each independent animation/animation set, as well as one for each independent linear media.

The high-level component includes an interval generator 410 that uses the event list (e.g., $406_3$) for each animation or media to compute a corresponding interval list (e.g., $412_3$), which is passed to the low-level component 210. In turn, the low-level component 210 includes a low-level computation engine 414 that controls the output based on the current time with respect to the interval data, such as by providing a progress value based on the interval data for that object and the current time to an low-level animation function subsystem $502_L$ that determines a current value for the varying property of an animated object. For example, for any given frame, the low-level computation engine 414 interpolates the location of the animated object based on the interval data and the current time (which may be the system time or a relative time). Note that as shown in FIGS. 4 and 5, the high-level timing component includes the timing tree 402 and the event lists $406_1$-$406_3$, while the low-level timing component 210 includes the interval lists $412_1$-$412_3$, however these data structures may be maintained essentially anywhere in storage, ordinarily in high-speed random access memory.

To summarize, the high-level timing component 206 sees a tree 402 of clocks related (e.g., hierarchically) by synchronization rules and primitives. Embodiments use the clocks in the high-level timing component 206 to compile lists of activation intervals 412 that are consumed by the low-level timing engine. The low-level timing engine sees the interval lists 412, which represent independent (e.g., per-animated object or per-linear media) clocks. As shown in FIG. 5, there is a clock that provides a consistent time to both, such as the system clock 524, so that the multiple levels remain in synchronization.

In response to interactive changes received from the application 202 (or some other source), the high-level timing component needs to update the state of the clock that is directly involved with that change, as well any that are indirectly involved as specified by the synchronization primitives. Note that it is possible that a change to a single clock can affect other clocks in the timing structure. For example, a presenter of a slide show can pause the entire display, whereby any animations and linear media currently being displayed need to be paused. As described below, in accordance with one embodiment, a Storyboard allows animations and/or media to be grouped together and thus coordinated in such a desired manner.

In general, anytime that interaction occurs with respect to an object, the event list is regenerated as necessary and the interval list recomputed and sent to the lower-level timing component. The higher-level component performs these operations, (for example at a frequency on the order of six to ten times per second) such that the lower level component (e.g., operating at sixty times per second) only needs to deal with the current interval list for each animated object.

In addition to this interval information and the starting and ending values for an object, additional parameters may be sent to the higher-level component and result in changes to the interval list. For example, an application can seek to a period in time, which corresponds to an event. The application specifies when the seek is to occur, and by how much. Like rewinding or fast-forwarding media, with a seek on an animation, an application can thus jump ahead or back to a particular point in time. A reverse event is another type of scheduled or interactive event that an application may specify. When a reverse event is in the list, the progress will automatically reverse, e.g., from one-hundred percent to zero percent. Speed changes are also supported, e.g., everything below a certain clock can be set to run faster or slower than actual time. Other attributes may be specified, such as to indicate for a particular clock whether restart is allowed, and/or whether to begin again if not currently running, e.g., start at one second, begin again at ten seconds, begin again at one-hundred seconds, and so forth, but optionally do or do not restart if currently running.

Storyboards for Coordinating Animations and Media

Embodiments are, among other things, directed to Storyboards, which comprise objects that allow a timeline tree to be specified for an element (e.g., a FrameworkElement such as a window, panel, control such as button and so forth). The timeline sets property values of elements, and controls animations for the element and its sub-tree. A Storyboard basically corresponds to a particular type of timeline object that may be started, stopped or paused, or used to seek, thereby controlling the appearance of animated elements and/or behavior of media that are associated with that Storyboard. Storyboards are available from both markup and code.

In some embodiments, an always-triggered model for animations and Storyboards is used. In addition, this model places the animations and Storyboards into a direct relationship with triggers (as opposed to a Storyboard property as in a previous implementation) in order to enable handoff behavior (described below in conjunction with FIGS. 6-9). Handoff behavior is a fundamentally triggered concept. As will be described below, an unspecified "from' value is defined based on the current value of animations that exist on a property at the time a new animation is triggered and the handoff behavior of the new animation. This means that an animation's "from' value (when unspecified) is defined only when the animation is triggered.

Since this property is defined only when the animation is triggered, this model associates the animations with triggers. In this model, animations are either inline in triggers or defined in Resources and unused until triggered.

In some embodiments, Storyboards include a collection of top-level timelines that can be associated with an element and started independently. Storyboards also provide connection points between a timing tree and an element tree that allows the animations in the Storyboard to resolve their targets relative to the element to which the Storyboard is attached. From markup, Storyboards also may be declared in a collection of Triggers that can be activated by state changes, events, or other actions and contain a set of extensible actions to be executed when the Trigger is activated (for instance, starting or stopping of a timeline). Storyboards may also be declared in the Resources property of an element, Style or Template.

In general, the timelines in a Storyboard represent animation templates that can be applied to various subtrees, elements, and other objects (e.g., text letters, words, lines, paragraphs and so forth). In accordance with one embodiment, storyboards (e.g., objects accessed via APIs) allow program authors to schedule sets of coordinated animations by grouping animations (to element properties) within timelines. In other words, a storyboard integrates the timing tree with the element tree, providing the ability to manipulate timing for different properties of different animations in a coordinated manner via the same timeline. Storyboards thus provide a way to combine otherwise independent timelines that affect a variety of objects and properties into a single timeline tree, enabling the program author to organize and control complex sets of timing events in a straightforward manner. For example, rather than having to find and restart individual animations, the grouping of animations under a timeline as part of a Storyboard allows restarting all the animations at once by simply restarting the Storyboard.

Storyboards can be used on particular instances of animations/video/audio, or to an animation of a particular style. In some scenarios, a single Storyboard declared as a Resource can be applied to multiple Elements via separate triggers on these elements. BeginStoryboard starts animations (or other media) on properties from either markup or code. From markup, BeginStoryboard employs FrameworkElement.BeginStoryboard to walk the tree of Timelines assigned to its Storyboard property. FrameworkElement.BeginStoryboard then calls FrameworkElement.BeginAnimation on any animations living on the leaves of the Storyboard's tree of Timelines. In markup, BeginStoryboard can be used in both event and property triggers.

From markup, the author can use the BeginStoryboard to start a Storyboard. BeginStoryboard.Storyboard contains a Storyboard whose attached properties provide the ability to target multiple properties on multiple elements. The Storyboard may contain all types of Timelines, including animations and MediaTimelines.

The following example illustrates an inline Storyboard. The container object (the Button) is animated. In this example, Storyboard.TargetName is supplied but in some embodiments this is not required because the animation is targeted at the container. BeginStoryboard.Storyboard tags are supplied automatically so they are not necessary.

In this embodiment, all animations target the container object when Storyboard.TargetName is not specified. Furthermore, they use the container as the Source of triggering events when the Source is not specified. These two assumptions allow simplification of the markup (no need to have TargetName or Source) in container-targeted and container-triggered scenarios.

```
<Window>
    <Button Width="2" Name="myButton">
        <Button.Triggers>
            <EventTrigger Event="Loaded">
                <EventTrigger.Actions>
                    <BeginStoryboard >
                        <Storyboard>
                            <DoubleAnimation To="4" Duration="0:0:1" Storyboard.TargetProperty="Width"
                                Storyboard.TargetName="myButton"/>
                            //TargetName is not required in this case
                        because the default target is the container.
                        </Storyboard>
                    </BeginStoryboard >
                </EventTrigger.Actions>
            </EventTrigger>
        </Button.Triggers>
    </Button>
</Window>
```

The following example illustrates Storyboard defined as a Resource. Because the animation is defined in the Resources section, it can be re-used in animation of other Framework Elements.

```
<Window>
    <Button Width="2">
        <Button.Resources>
            <DoubleAnimation To="4" Duration="0:0:1"
    x:Key="myAnimation" />
        </Button.Resources>
        <Button.Triggers>
            <EventTrigger Event="Loaded">
                <EventTrigger.Actions>
                    <BeginStoryboard Storyboard ="{StaticResource
    myAnimation}" TargetProperty="Width"/>
                </EventTrigger.Actions>
            </EventTrigger>
        </Button.Triggers>
    </Button>
</Window>
```

As illustrated in the above examples, in addition to integrating a timing tree with an element tree, storyboards allow the use of event triggers to control their operation (e.g., start, pause, seek and stop actions). In addition, storyboards can be used with property triggers. In general, a property trigger corresponds to some state/value such as true or false, whereas an event fires (and thus does not have a false value). For example, a property trigger may have a true value when the mouse was hovering over an element, and a false value when not hovering over it. Each true or false state may be used to separately start, stop, pause, and/or seek in a storyboard (or storyboards). An event, such as a mouse click on an element, fires and thus does not have a variable state, but likewise may control a storyboard's operation. In this manner, animations are controllable via user interaction with the displayed element tree representation.

An event trigger takes as its source an event that causes actions to occur when that event fires on the host element. Note that, unlike property triggers, an event trigger is not scoped; it performs an operation, then that operation determines its own lifetime. For example, one event may start a timeline, and that timeline may run until its duration completes, or until another event trigger or the like stops it.

Figure 6:
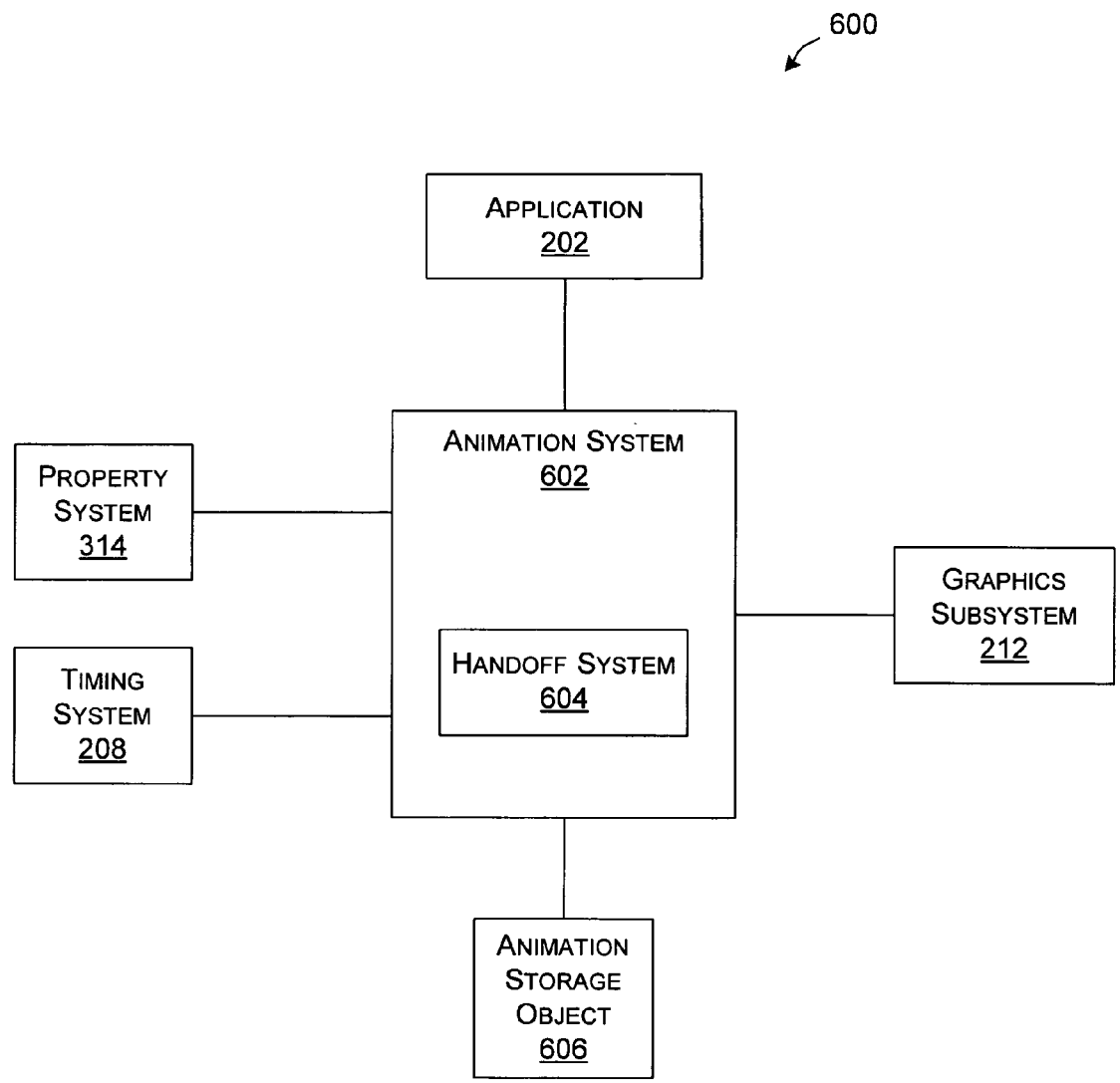
FIG. 6 is a block diagram generally representative of a system to provide smooth transitions between rich media, in accordance with an embodiment.

FIG. 6 illustrates a system 600 that can provide smooth transitions between rich media, in accordance with an embodiment. In this embodiment, system 600 includes an animation system 602 having a handoff system 604, in addition to previously described application 202, timing system 208, graphics subsystem 212, and property system 314. Some of the functions of these components used in such transitions, according to various embodiments, are described below.

Property system 314, as previously described, can store values for properties of various visual objects (not shown) instantiated by application 202. For example, property system 314 may store, among other object properties, the base values for length and width properties of an object representing a button to be displayed in a UI.

Timing system 208, as previously described, can coordinate the timing of animations created by application 202. For example, timing system 208 can provide timeline information used in calculating current values of properties that are being animated. In one embodiment, timing system 208 can receive event and property change information from interactive elements (not shown) to generate triggers (e.g., event triggers, property triggers) used in generating animations. For example, the interactive elements may monitor mouse and/or keyboard activity and provide information to timing system 208 to cause timing system 208 to start timelines and provide triggers to animation system 602.

Graphics subsystem 212, as previously described, can generate the data needed to render the animations on a display device.

Animation system 602, in this embodiment, performs the operations that change the property values that create visual animated effects. In one embodiment, animation system includes components such as high and low level composition and animation engines 206 and 208 as well as handoff system 604. Also, animation system 602 can receive from application 202, specified "from" and "to" values for animated properties, as well as a specified time period for performing the animations. In some animations, default "to" and/or "from" values for animated properties may be used when not specified by the application.

Handoff system 604, in this embodiment, can be used when an animation is to be performed on a property while another animation is still being performed on that property. In some embodiments, handoff system 604 can perform several different handoffs, such as those listed below in Table 1. The term "old" animation refers to the animation that is running for a particular property when application 202 starts another animation for the same property. In some scenarios, an old animation may be a "composition" (i.e., a composition as defined in Table 1) of two or more other animations. In some embodiments, animation system 602 can be implemented to provide default handoff behavior for one or more predetermined scenarios. In this embodiment, Table 1 describes various values of a handoff behavior property that can be set in an animation. The handoff behavior property basically describes what to use as the value of the animation's "from" value and what to do with the old animation.

TABLE 1

| Handoff | Behavior |
|---------|----------|
| Compose | Old animation is continued and for each rendering cycle the new animation uses output value of old animation as its "from" value. The output value of the new animation is used as the value for rendering the property. |

TABLE 1-continued

| Handoff | Behavior |
| --- | --- |
| Replace | Old animation is released and new animation uses base "to" and "from" values when the values are unspecified. |
| Snapshot and Replace | Current value of old animation is obtained (i.e., the snapshot) and old animation is released. New animation then uses snapshot as "from" value and the base value for the "to" value when unspecified. |
| Snapshot and Retain | Snapshot of old animation is obtained and old animation is allowed to keep running without affecting the value of the animated property. New animation uses snapshot as "from" value and the base value for the "to" value when unspecified. When new animation ends, the old animation is then allowed to resume animation of the property. |
| Snapshot and Retain/Paused | Snapshot of old animation is obtained and old animation is paused. New animation uses snapshot as "from" value and the base value for the "to" value when unspecified. When new animation ends, the old animation is then allowed to animate the property from the state of the animation when paused. |
| Blend | Use a weighted average of the animations |
| Queue | Queue up pending animations until existing animations are complete. |

Using the button example once more, an application can be written to cause a button to grow to a particular size over a particular time period when a mouse cursor moves onto the button, and then to shrink to the original size over a particular time period when the mouse cursor leaves the button. In this scenario, the user then quickly moves the cursor on and off the button before the particular time period completely elapses. Thus, the "grow" animation will start upon "MouseOver" and then the "shrink" animation will start upon "MouseExit" before the grow animation is completed.

If the handoff behavior for the "grow" animation is the "snapshot and replace" behavior (can be specified or default) described above in Table 1, at the time the cursor leaves the button, the current values of the length and width of the button resulting from the "grow" animation will be snapshotted. In this embodiment, the snapshotted values are stored in an animation storage object 606. Animation system 602, in this embodiment, creates an animation storage object 606 for each animated property. In some embodiments, animation storage object 602 is configured to perform the calculations for the changes in length and width properties that cause the button to appear to grow and shrink when rendered by graphics subsystem 212.

After the values for the animated properties are snapshotted, the "grow" animation is released (i.e., the "grow" animation is in effect terminated), and the "shrink" animation will started with "from" values for the length and width properties being the snapshotted values. If no other animations are started that affect the width and length properties of the button, the "shrink" animation will complete and at the end of the animation the length and width properties of the button will be at the base values.

The "snapshot and replace" behavior causes the transition between the "grow" and "shrink" animations to appear smooth to the user. That is, the appearance of the button would smoothly grow to a certain size and then smoothly shrink from that same size. In other system that do not have the aforementioned snapshot capability, application 202 or animation system 602 would likely have to provide a "from" value for the "shrink" animation (e.g., the base "from" value or the target value of the "grow" animation), which would likely result in an unexpected "glitch" in the appearance of the button. That is, the appearance of the button would grow to a certain size, but then appear to suddenly change to a different size from which the button size would start shrinking. The aforementioned advantages of snapshotting can also apply to the "snapshot and retain" and the "snapshot and retain/paused" behaviors described above in Table 1.

Below is an example of the code using "snapshot and replace" handoff behavior. This button grows on MouseEnter and shrinks on MouseLeave where snapshot and replace behavior is the default handoff behavior.

```
<Grid xmlns="http://schemas.microsoft.com/winfx/avalon/2005"
   xmlns:x="http://schemas.microsoft.com/winfx/xaml/2005">
   <Grid.Resources>
      <Style x:Key="GelButton" TargetType="{x:Type Button}">
         <Setter Property="Button.RenderTransform">
            <Setter.Value>
               <ScaleTransform Center="0,0" ScaleX="1" ScaleY="1" />
            </Setter.Value>
         </Setter>
         <Style.Triggers>
            <EventTrigger RoutedEvent="Mouse.MouseEnter">
               <EventTrigger.Actions>
                  <BeginStoryboard>
                     <Storyboard>
                        <DoubleAnimation Duration="0:0:0.2"
Storyboard.TargetProperty="RenderTransform.ScaleX" To="1.5"
AccelerationRatio=".9" />
                        <DoubleAnimation Duration="0:0:0.2"
Storyboard.TargetProperty="RenderTransform.ScaleY" To="1.5"
AccelerationRatio=".9" />
                     </Storyboard>
                  </BeginStoryboard>
               </EventTrigger.Actions>
            </EventTrigger>
            <EventTrigger RoutedEvent="Mouse.MouseLeave">
               <EventTrigger.Actions>
                  <BeginStoryboard>
                     <Storyboard>
                        <DoubleAnimation Duration="0:0:0.2"
Storyboard.TargetProperty="RenderTransform.ScaleX"
AccelerationRatio=".9" />
                        <DoubleAnimation Duration="0:0:0.2"
Storyboard.TargetProperty="RenderTransform.ScaleY"
AccelerationRatio=".9" />
                     </Storyboard>
                  </BeginStoryboard>
               </EventTrigger.Actions>
            </EventTrigger>
         </Style.Triggers>
      </Style>
   </Grid.Resources>
   <Button Style="{StaticResource GelButton}" Width="100"
      Height="100"/>
</Grid>
```

Exemplary "Snapshot and Replace" Operational Flow

Figure 7:
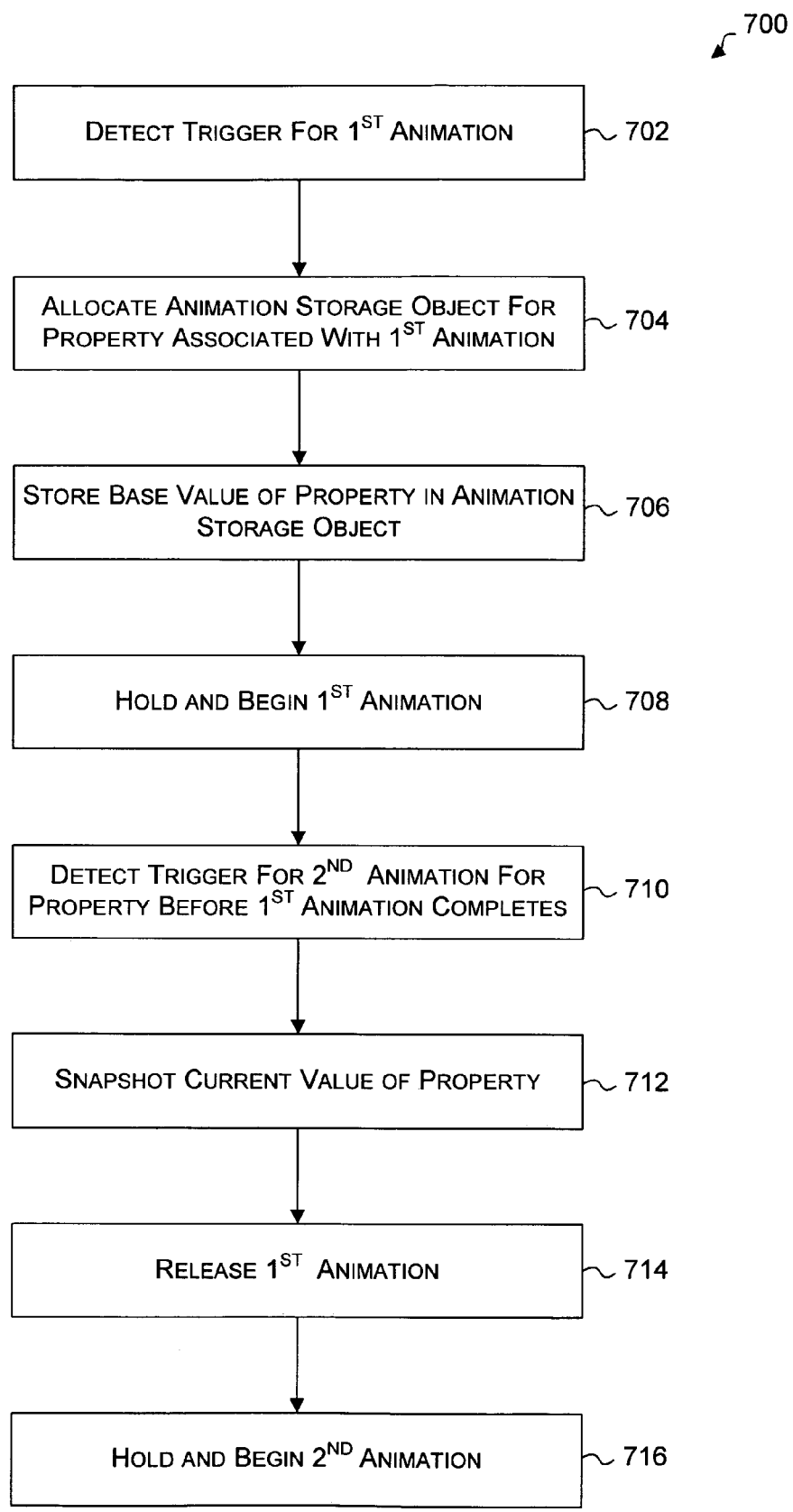
FIG. 7 is a flow diagram generally representative of operational flow in performing a handoff operation, in accordance with an embodiment.

FIG. 7 illustrates an operational flow 700 for performing "snapshot and replace" behavior, according to one embodiment. Operational flow 700 may be performed in any suitable computing environment. For example, operational flow 700 may be executed by a system such as system 600 (FIG. 6). Therefore, the description of operational flow 700 may refer to at least one of the components of FIG. 6. However, any such reference to components of FIG. 6 is for descriptive purposes only, and it is to be understood that the implementations of FIG. 6 are a non-limiting environment for operational flow 700.

At a block 702, a trigger for an animation is detected. In one embodiment, an animation system such as animation system 602 (FIG. 6) detects the trigger (e.g., an event trigger or a property trigger). In some embodiments, the animation system may receive a notification of the trigger from interactive elements (described above in conjunction with FIG. 6). In this example operational flow, there are no other animations currently running for the property associated with the animation (i.e., the property that changes when the visual object is "animated").

At a block 704, an animation storage object is allocated. In one embodiment, the animation system creates the animation object such as animation storage object 606 (FIG. 6) to handle animations for the property associated with the animation. In some embodiments, an animation storage object can be created for each property to be animated. When all of the animations for a property have been completed, the animation storage object may be deleted in some embodiments. In some embodiments, when the animation(s) reach their fill value(s), the fill value(s) may be retained in the animation storage object but the rest of the information of the stored information may be deleted.

At block 706, a base value of the property associated with the triggered animation is stored in the animation storage object. In one embodiment, the animation system stores the base value in the animation storage object. The base value is obtained from a property system such as property system 314 (FIG. 6).

At block 708, the animation is started and the animation is held by the animation storage object. In one embodiment, the animation storage object will, in effect, recalculate the values for the property at the screen refresh rate until the animation completes (or is replaced or paused) so that the visual object will appear to be animated. The animation storage object also holds the animation (i.e., maintains information defining the current state of the animation so that the animation can be located and continued if the animation is retained or retained/paused) while the animation is running.

At a block 710, a trigger for a second animation involving the same property is detected before the first animation is completed. As in block 702, the animation system detects this other trigger, in one embodiment. In this example operational flow, the second animation is configured to have handoff behavior such as defined in Table 1 for "snapshot and replace" behavior.

At a block 712, the current value of the property resulting from the first animation is saved (i.e., snapshotted). In one embodiment, the snapshot is stored in the animation storage object. For example, the animation system can calculate the value for the property for the next screen refresh according to the first animation and save this calculated value (i.e., snapshot) in the animation storage object.

At a block 714, the first animation is released. In one embodiment, the animation system deletes the state information of the first animation that was stored in the animation storage object.

At a block 716, the second animation is started and the second animation is held by the animation storage object. In accordance with this embodiment, the snapshot is used as the "from" value of the property when running the second animation. Similar to the operation of block 708, the animation system will, in effect, recalculate the values for the property at the screen refresh rate until the animation completes (or is replaced or paused) so that the visual object will appear to be animated. The animation storage object also holds the second animation (i.e., maintains information defining the current state of the second animation so that the second animation can be located and continued if the second animation is retained or retained/paused) while the second animation is running.

Although operational flow 700 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 8:
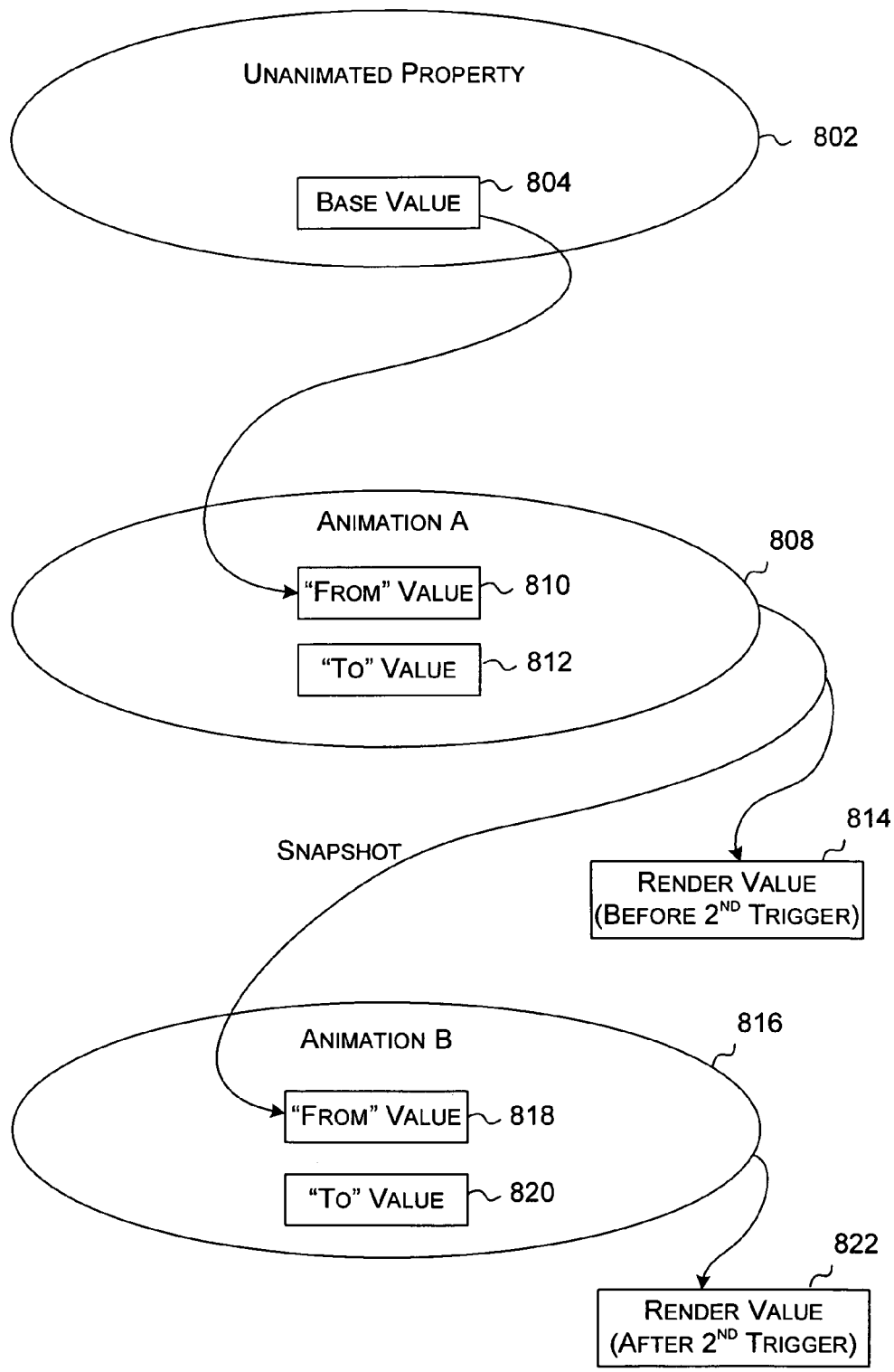
FIG. 8 is a representation of a transition between two animations using a handoff operation, in accordance with an embodiment.

FIG. 8 illustrates how the values for the property associated with an animation are obtained according to "snapshot and replace" handoff behavior (Table 1), according to one embodiment. In this embodiment, an unanimated property 802 has a base value 804. In one embodiment, the base values are stored in a property system such as previously described property system 314 (FIGS. 3, 6).

When an animation 808 (indicated as Animation A in FIG. 8) is started that affects the property 802, base value 804 is typically used as the "from" value 810 for animation 808. The "to" value 812 of animation 808 may be specified by the application (e.g., such as application 202 in FIG. 6) that created animation 808. In some scenarios, the "to" and "from" values may be left unspecified by the application, resulting in using the base values by default. In one embodiment, the "to" and "from" values are stored in an animation storage object such as animation storage object 606 (FIG. 6), which can be allocated by an animation system such as animation system 602 (FIG. 6) when animation 1108 is started. While animation 808 is running, the value of the property (as changed according to animation 808) is calculated for each time the screen is refreshed and output as a render value 814.

In this example, an animation 816 (indicated as Animation B in FIG. 8) is started before animation 808 is completed. In this example, animation 816 has been configured to have "snapshot and replace" behavior. When started, animation 816 snapshots the property and uses the snapshot as the "from" value 818 of animation 816. The "to" value 820 of animation 816 may be specified by the application that created animation 816. In other scenarios, the "to" value 820 may be unspecified, causing the base "to" value to be used. In some embodiments, these "to" and "from" values can be stored in the aforementioned animation storage object. Further, animation 808 is released so that only animation 816 affects the values of the property. While animation 816 is running, the value of the property (as changed according to animation 816) is calculated for each time the screen is refreshed and output as a render value 822.

If the handoff behavior were "snapshot and retain", animation 808 would not be released. Rather, animation 808 would be allowed to continue running, but the values of the property would be calculated using only animation 816 (i.e., animation 808 would be ignored). Then when animation 816 completed, animation 808 would be resumed using the latest value of the property as generated by animation 816. Similarly, if the handoff behavior were "snapshot and retain/pause", animation 808 would not be released. Rather, animation 808 would be allowed be paused at the state it had when animation 816 started, and the values of the property would be calculated using only animation 816. Then when animation 816 completed, animation 808 would be resumed using the value of the property when animation 808 was paused.

Figure 9:
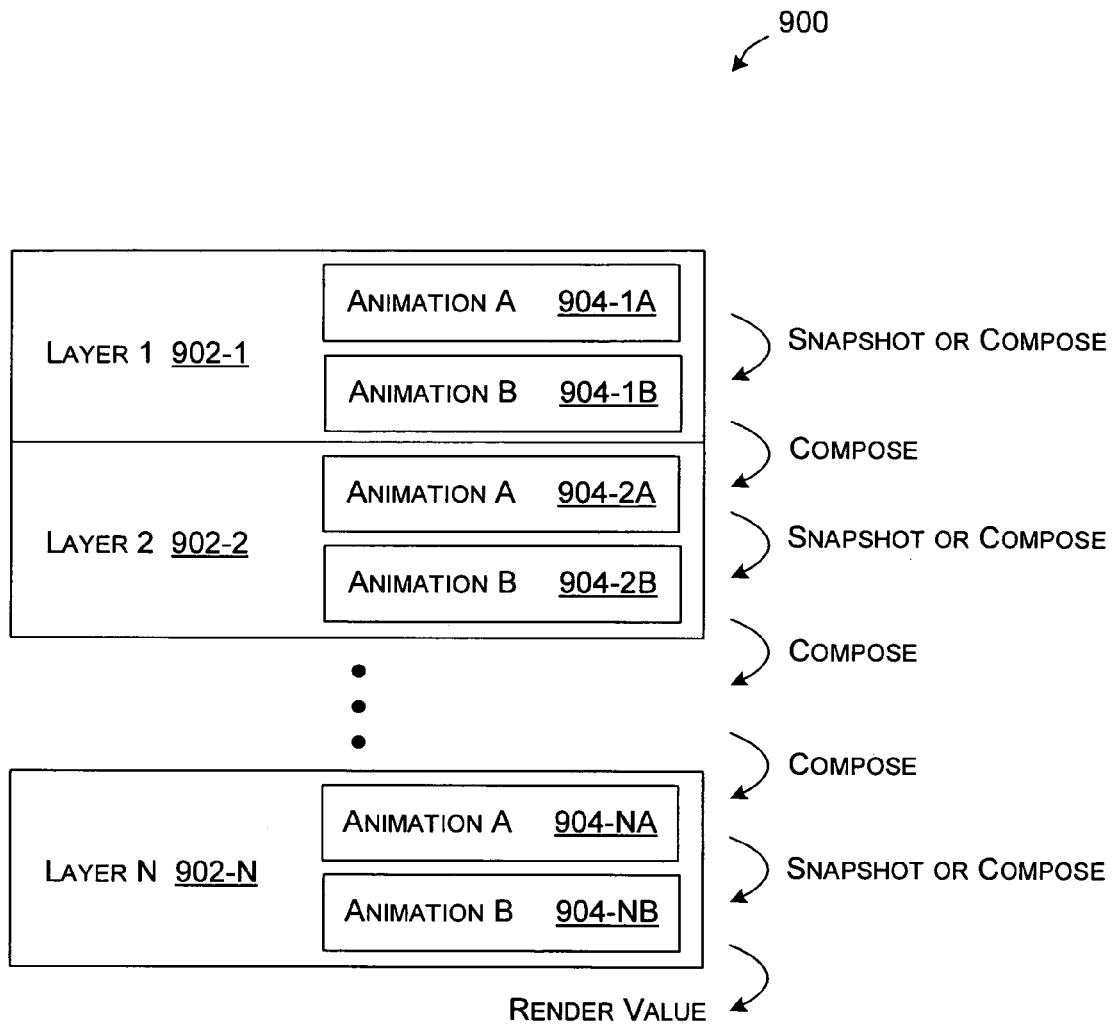
FIG. 9 is a representation of relationships between layered animations, in accordance with an embodiment.

FIG. 9 is a representation of relationships between layered animations, according to one embodiment. In this embodiment, a visual object 900 is defined by an application (such as application 202 of FIG. 6) that can have several animations, which are logically arranged in layers. In this example, the visual object includes layers 902-1 through 902-N. Layer 902-1 includes an animation 904-1A and an animation 904-1B; layer 902-2 includes an animation 904-2A and an animation 904-2B, and so on to layer 902-N that includes an animation 904-NA and an animation 904-NB. Although in this example there are N layers and each layer includes two animations, the number of layers and the number of animations per layer can vary depending on the design choices of the application developer.

In one embodiment, the first layer 902-1 is defined so as to contain all of the animations that are started by event triggers (as opposed to property triggers). Thus, the animations of layers 2 through N are started by property triggers. In some embodiments, each layer is associated with a single property trigger and includes the animation(s) that are started by that property trigger. Further, in this embodiment, the animations that are running are performed in order from the first layer 902-1 to the Nth layer 902-N. Still further, in this embodiment, animations within a layer may be defined with handoff behavior that includes snapshots (e.g., "Snapshot and Replace", "Snapshot and Retain", "Snapshot and Retain/Pause" as described in Table 1) and/or compositions, whereas transitions between layers have composition handoff behavior. An example of composition handoff behavior is described below in conjunction with FIG. 10.

In some embodiments, the precedence of composition within a layer may be predefined. The value outputted by a higher precedence animation will be used as the "from" value for the next lower precedence animation.

In one embodiment, precedence is defined as follows: (1) triggered animations from styles, with the order in which they appear in the markup or code defining the precedence for multiple "style" triggered animations within the layer; (2) triggered animations from local element triggers, with the order in which they appear in the markup or code defining the precedence for multiple "local element" triggered animations within the layer; and (3) animations applied from a storyboard or method call, with the order in which they were applied defining the precedence for the "storyboard/method call applied" animations.

In some embodiments, when all of the animation(s) of a layer exit, the layer may be removed. A layer may be removed from any position in the "stack" of layers.

Figure 10:
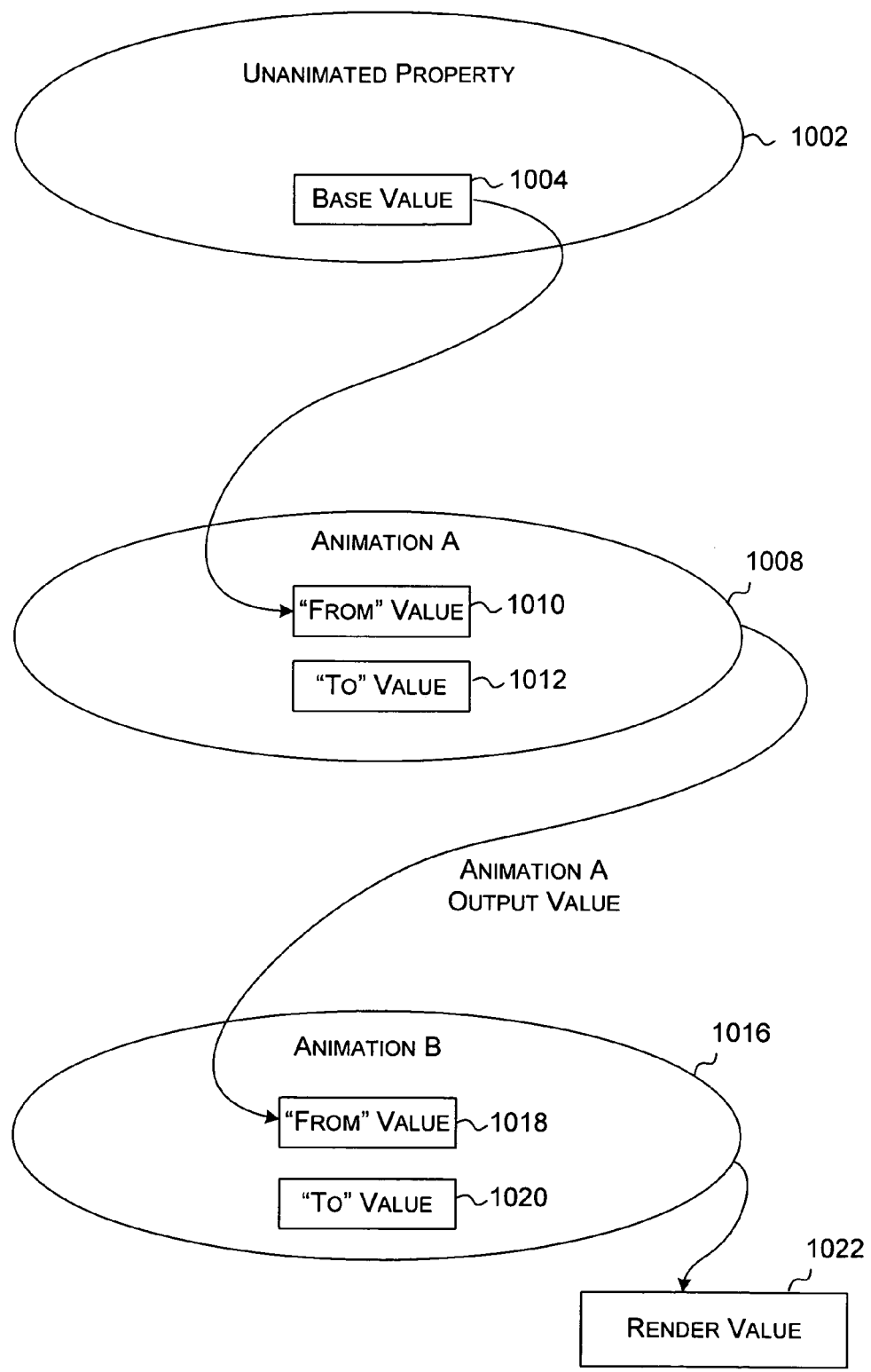
FIG. 10 is a representation of a composition of two animations, in accordance with an embodiment.

FIG. 10 illustrates a composition of two animations, according to one embodiment. In this embodiment, an unanimated property 1002 has a base value 1004. In one embodiment, the base values are stored in a property system such as previously described property system 314 (FIGS. 3, 6).

When an animation 1008 (indicated as Animation A in FIG. 10) is started that affects the property, base value 1004 is typically used as the "from" value 1010 for animation 1008. The "to" value 1012 of animation 1008 may be specified by the application (e.g., such as application 202 in FIG. 6) that created animation 1008. In one embodiment, the "to" and "from" values are stored in an animation storage object such as animation storage object 606 (FIG. 6). Although not shown in FIG. 10, while animation 1008 is running by itself, the value of the property (as changed according to animation 1008) is calculated for each time the screen is refreshed and provided as the "render" value to a graphics subsystem such as graphics subsystem 212 (FIGS. 3, 6).

In this example, an animation 1016 (indicated as Animation B in FIG. 10) is started before animation 1008 is completed. In this example, animation 1016 has been configured to have "compose" behavior. As opposed to "snap and replace" behavior, animation 1008 continues running so that the instantaneous value of the property is continually updated. However, the instantaneous value of the property resulting from animation 1008 is not used the "render" value. Rather, the instantaneous value calculated as a result of animation 1008 is used as the "from" value 1018 of animation 1016 as a kind of intermediate value. The "to" value 1020 of animation 1016 may be specified by the application that created animation 1016. In some embodiments, the "to" and "from" values can be stored in the aforementioned animation storage object. The value of the property resulting from animation 1016 is then used as a render value 1022. While animations 1008 and 1016 are running, the value of the property (as changed according to the composition of animations 1008 and 1016) is calculated for each time the screen is refreshed and output as a render value 1022.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A computer-implemented method for transitioning between a first animation of a user interface element and a second animation of the user interface element, the method comprising:
   starting the first animation of the user interface element; wherein the first animation of the user interface element includes adjusting a value of a property of the first user interface element; wherein the property is a size property that affects a size of the user interface element when the value is adjusted;
   setting a handoff behavior that specifies what actions to take when the second animation is started and the first animation is still adjusting the value of the size property of the user interface element;
   detecting a trigger for the second animation while the first animation is running, wherein the first and second animations adjust the value of the size property of the user interface element; wherein the trigger is an event generated in response to a user interaction with the user interface element;

recalculating a value of the property of the user interface element during the running of the first animation;

storing the recalculated value of the property each time the value is recalculated; and causing the second animation to run using the specified handoff behavior including using the recalculated value.

2. The method of claim 1 further comprising allocating an animation storage object for the property, wherein the animation storage object is to store a value of the property resulting running of the first and second animations.

3. The method of claim 1 wherein the handoff behavior is selected from one of:

a compose handoff behavior that indicates that the first animation is continued and for each rendering cycle of the first animation, the second animation uses an output value of the first animation as its "from" value, wherein an output value of the second animation is used as a value for rendering the property;

a replace handoff behavior indicating that the first animation is released and the second animation uses base "to" and "from" values when the "to" and "from" values are unspecified;

a Snapshot and Replace handoff behavior indicating that a current value of the property of first animation is obtained and the first animation is released, the second animation uses the obtained current value as the "from" value and the base value for the "to" value when unspecified;

a Snapshot and Retain handoff behavior indicating that a current value of the property of first animation is obtained and the first animation is keeps running without affecting the value of the property, the second animation uses the obtained current value as the "from" value and the base value for the "to" value when unspecified, when the second animation ends, the first animation resumes animation of the property;

a Snapshot and Retain/Paused handoff behavior indicating that a current value of the property of first animation is obtained and the first animation is paused, the second animation uses the obtained current value snapshot as the "from" value and the base value for the "to" value when unspecified, when the second animation ends, the first animation animates the property from the state of the first animation when paused;

a blend handoff behavior indicating to use a weighted average of the first animation and the second animation; and a queue handoff behavior indicating to queue up pending animations until existing animations are complete.

4. The method of claim 1 further comprising allowing the first animation to run without affecting the value of the property while the second animation is running.

5. The method of claim 1 further comprising pausing the running of the first animation while the second animation is running.

6. The method of claim 1 wherein animations for a property are logically organized into a plurality of layers, wherein a layer may be selectively removed when all animations in the layer have exited.

7. The method of claim 1 further comprising detecting a trigger for a third animation while the second animation is running, wherein the first and second animations are part of one layer and the third animation is part of another layer, wherein a value of the property resulting from the second animation is used as a "from" value for the third animation, and a value of the property resulting from third animation is to be used as a render value for the property in rendering the visual object.

8. One or more computer-readable storage media having stored thereon instructions that when executed by a computer implement the method of claim 1.

9. A system for processing a first animation and a second animation, the system comprising:

a property system to store values for properties of visual objects to be displayed;

a graphics subsystem to provide data used to display the visual objects via a display device; and an animation system to calculate a series of values of a property of a visual object used in animating the visual object when displayed via the display device, wherein the property is a size property that affects a size of the visual object when a value of the size property is adjusted during the animation; wherein the animation system is to detect a trigger for the second animation while the first animation is running, wherein the trigger is an event generated in response to a user interaction with the visual object; recalculate a value of the property during the running of the first animation; store the recalculated value of the property resulting from the running of the first animation, and start the second animation using the recalculated stored value of the property as a "from" value; wherein the from value is a starting point of the second animation and wherein the first animation and the second animation are animations of a visual object on a graphical user interface.

10. The system of claim 9 wherein the animation system is to allocate an animation storage object for the property, the animation storage object to store a value of the property resulting running of the first and second animations.

11. The system of claim 9 wherein the animation system is to release the first animation when the second animation is started.

12. The system of claim 9 wherein the animation system is to allow the first animation to run without affecting the value of the property while the second animation is running.

13. The system of claim 9 wherein the animation system is to pause the running of the first animation while the second animation is running.

14. The system of claim 9 wherein the animation system is to obtain at least one base value for the property from the property system prior to running the first animation.

15. The system of claim 9 wherein the animation system is to detect a trigger for a third animation while the second animation is running, wherein the first and second animations are part of one layer and the third animation is part of another layer, wherein a value of the property resulting from the second animation is used as a "from" value for the third animation, and a value of the property resulting from third animation is to be used as a render value for the property in rendering the visual object.

16. One or more computer-readable storage media having stored thereon instructions that when executed by a computer implement the system of claim 9.

17. A computer-implemented method for animating visual element, the method comprising, defining a set of triggerable animations for a visual element displayed on a graphical user interface, the set including a first subset of one or more triggerable animations and one or more other subsets of triggerable animations, wherein each of the triggerable animations of the first subset are triggerable by either an event trigger or a property trigger generated in response to a user interaction with the visual element, wherein each of the triggerable animations of the one or more other subsets are each triggerable by a property trigger generated in response to a user interaction with the visual element, recalculating a size property value during each of the animations that affects a size of the visual element when recalculated; storing the recalculated property; and using the recalculated value to determine a "from" position from which to begin a subsequent animation; and wherein composition handoff behavior is used to transition from an animation of one subset to an animation of another subset.

18. The method of claim 17 wherein a second animation of one of the set's subsets, when started, selectively causes a snapshot to be obtained of a property value that is affected by a first animation of that subset, the first animation running when the second animation is started.

19. The method of claim 18 wherein the first animation is released when the second animation is started.

20. One or more computer-readable storage media having stored thereon instructions that when executed by a computer implement the method of claim 17.

* * * * *